Aug. 12, 1958   T. B. PARKER   2,846,845
FUEL DRAINAGE SYSTEM FOR PLURAL MANIFOLDS
Filed June 24, 1953   2 Sheets-Sheet 2

Inventor:
Theodore B. Parker,
by   Edward M. Tittle
His Agent.

2,846,845

FUEL DRAINAGE SYSTEM FOR PLURAL MANIFOLDS

Theodore B. Parker, Hamilton, Ohio, assignor to General Electric Company, a corporation of New York Application June 24, 1953, Serial No. 363,711

5 Claims. (Cl. 60—39.09)

This invention refers generally to aircraft gas turbines and more particularly to a drain valve arrangement for the fuel providing means for aircraft gas turbine combustion chambers and is a parallel development of the drain arrangement disclosed in the concurrently filed patent application (Serial No. 363,712, filed June 24, 1953) by J. A. F. Roche and R. F. Bookmyer, having the same assignee.

Unburnt fuel drainage is of vital importance when aircraft gas turbines are shut down after a period of operation and in those cases where the starting cycle is not completed because combustion did not begin. Although combustion chamber drain arrangements are old in the art, it is not desirable to permit fuel in the supply lines to leak through the nozzles because of the tendency for the fuel inlets to clog due to the carbonization of the fuel as it issues slowly from the heated nozzles. Furthermore, fuel drainage prior to the combustion chambers will reduce the danger of flaming which exists when unburned fuel is present in quantity in the combustion chambers.

Accordingly, it is an object of my invention to provide an improved fuel manifold drainage system which is simple in construction yet automatic in its operation.

Another object of invention is to provide an improved fuel drain arrangement for aircraft gas turbine combustion chambers which positively prevents fuel drainage when the turbine is in operation.

A further object of my invention is to provide a fuel manifold drainage means paralleled with the manifolds which closes to prevent drainage at a minimum fuel pressure and opens to permit the same upon pressure release.

A still further object of invention is to provide a simplified fuel drain arrangement for a duplex nozzle system which has a minimum of parts.

Another object of invention is to provide for use with a duplex fuel nozzle system, interconnected valve structures which are closed simultaneously against drainage and have means to prevent low pressure back flow.

Figure 1:
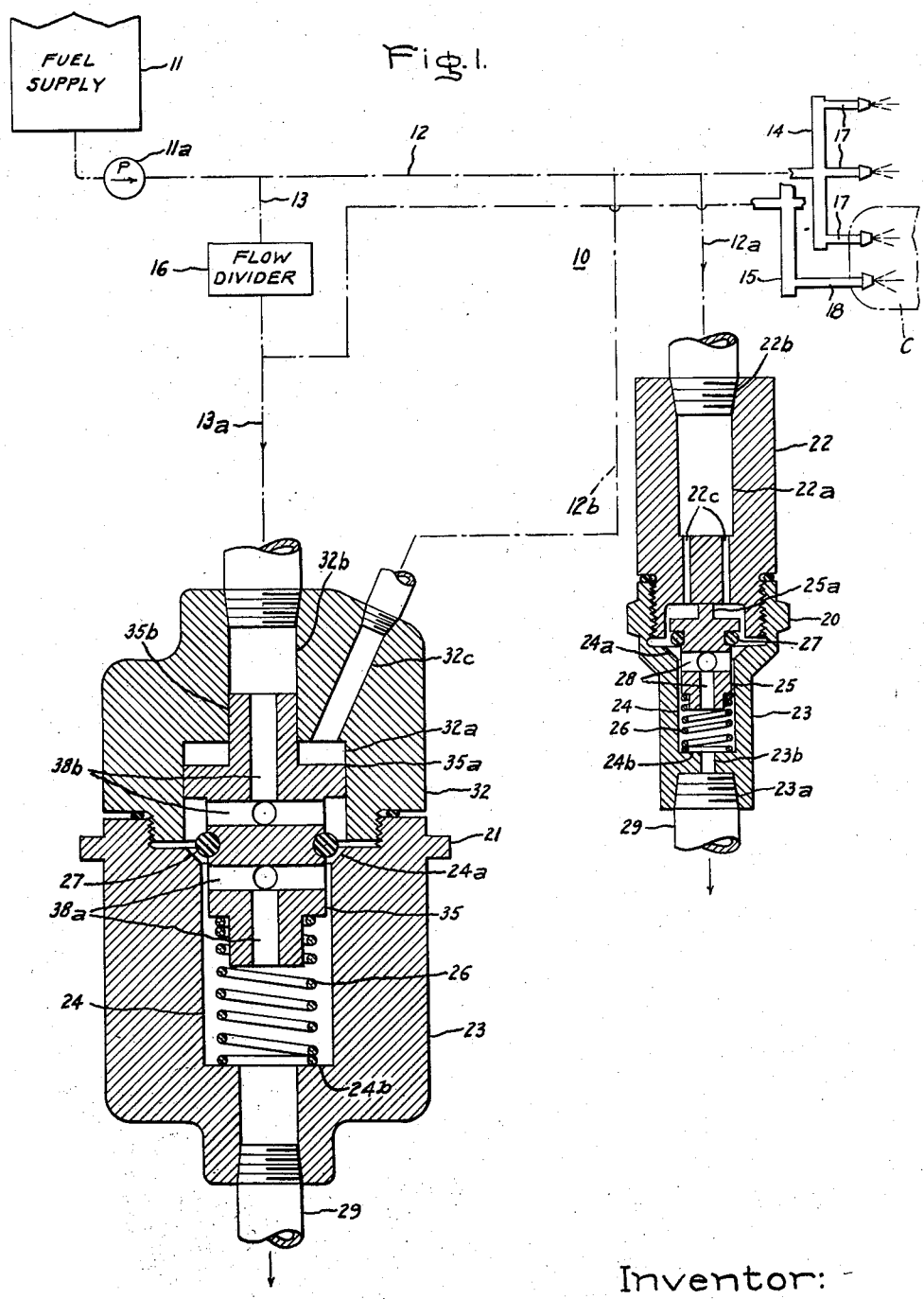
Figure 2:
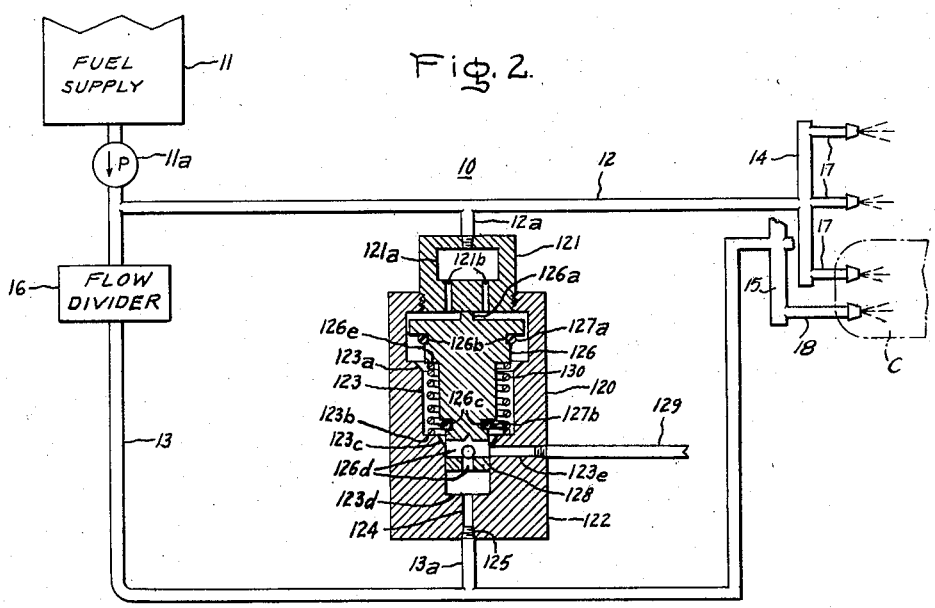
Figure 2A:
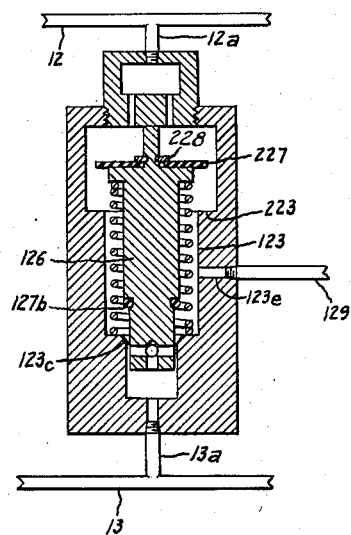

These and other objects of invention will become more apparent by reference to the following description taken in conjunction with the accompanying drawing which illustrates preferred embodiments of my invention and in which Fig. 1 is a diagrammatic showing of the discharge end of a fuel provision system for an aircraft gas turbine combustion chamber grouping using duplex type fuel spray nozzles, with an enlarged showing of the drain valve assemblies;

Fig. 2 is a similar diagrammatic showing of a modified fuel manifold drainage system with an enlarged showing of the drain valve assembly; and Fig. 2a is an enlarged showing of a modification of the drain valve assembly of Fig. 2.

The objects of my invention may be accomplished by the interconnection of spring loaded valve assembly structure with a fuel provision system so that under a predetermined minimum pressure drop resulting from a selected fuel rate of flow, drainage is prevented.

Referring to the drawing, the discharge end of a fuel providing system preferably for duplex type vortex spray nozzles is shown generally at 10, the source of fuel at 11, with a pump 11a and conduits 12 and 13 providing fuel respectively to the small and large slot manifolds 14 and 15, the flow to the latter manifold being controlled by flow divider 16.

The general characteristics and operation of the preferred duplex type vortex spray nozzle are more fully disclosed in U. S. Patent No. 2,524,820, issued to G. N. Miles, and a suitable flow divider construction is fully disclosed in U. S. Patent No. 2,590,853 to C. D. Fulton. In aircraft gas turbines, each combustion chamber is provided with a nozzle containing two series of orifices, called the small slot or primary series and the large slot or secondary series. The small slot series is supplied by a small diameter manifold and is used to provide a correct spray pattern at low fuel pressure for starting. The large slot series is supplied by a large diameter manifold and provides the additional flow necessary for normal operation.

In the drawing, the series of small slots are indicated at 17 and the series of large slots at 18, one of each being shown projecting into the closed end of a combustion chamber indicated diagrammatically at C. Drainage conduits 12a and 13a lead respectively from conduits 12 and 13 to valve assemblies 20 and 21, with a by-pass conduit 12b connecting conduit 12 with valve assembly 21.

Valve assembly 20 comprises a chamber housing 22 and a valve proper 23, attached to each other by screw thread means. Valve 23 contains a bore 24, with an outwardly flaring valve seat 24a and shoulder 24b, and communicates with the drain outlet port 23a by means of passage 23b. Within bore 24, a loose fitting piston 25 is seated on a spring 26, in turn resting on shoulder 24b and normally urging the piston outwardly. The head of the piston has a spacing projection 25a and a groove for seating an O-ring 27. Within piston 25 are internal passages 28 whose function will be described later. Housing 22 includes a chamber 22a, inlet port 22b and outlet ports 22c.

Valve assembly 21 consists of a chamber housing 32 and a valve proper 23, attached to each other by screw thread means. Valve 23 comprises the same elements, which are similarly numbered, in both valve assemblies 20 and 21 except for the piston 35, which contains two separate series of internal passages 38a and 38b communicating with respective ends of the piston. A groove on the piston body approximately midway the ends seats on O-ring 27.

Chamber housing 32 includes a bore 32a and inlet ports 32b and 32c to which are joined, respectively, drainage conduit 13a and by-pass conduit 12b. Differential piston 35 fits loosely into bore 24 of valve 23 but is in substantially fluid sealing contact with the surface defining bore 32a, as at the shoulder 35a, and with the surface defining inlet port 32b as at the hollow guide projection 35b.

In operation, my novel fuel drain arrangement works as follows: the initial supply of fuel at comparatively low pressure passes through conduits 12 and 13 towards the fuel manifolds 14 and 15 but due to the interposition of the flow divider 16, substantially no fuel reaches the large slot manifold 15. The fuel reaches the small slot manifold 14 and eventually is sprayed from the small slots 17. The fuel also passes through conduits 12a and 12b into the housing chambers 22a and 32a and against the heads of pistons 25 and 35 in valve assemblies 20 and 21 respectively, forcing them into closed position, the O-rings at 27 resting on seats 24a and providing the sealing. This closes both valves postively against drainage from conduits 12 and 13; and in addition, the close fits of shoulder 35a and guide projection 35b of piston 35 in housing 32 prevents any fuel back flow into the large slot manifold 15 before the flow divider is operating, obviating faulty starting resulting from poor spray characteristics.

As the pressure of the fuel supply rises, the flow divider 16 becomes operative and fuel passes into the large slot manifold 15 and is sprayed from the large slots 18. This fuel also passes through conduit 13a and acts against portions of the opposed faces of piston 35 in valve 21. However, because the pressure drop across flow divider 16 causes the pressure in conduit 13a to be lower than that in conduit 12a, and because of the proportioning of the various surfaces of the valve piston 35 exposed to these different pressures, there is a net force acting on the valve piston in opposition to spring 26 and of magnitude sufficient to hold the valve in closed position so that fuel drainage is prevented.

When the pressure of the fuel supply drops as upon engine shutdown, the fuel, without any drainage system, would tend to drain into the combustion chambers and increase fire danger.

With my novel fuel drainage system, any appreciable seepage into the combustion chambers is prevented. Springs 26 in the valve assemblies 20 and 21, upon release of the fuel supply pressure, will unseat the pistons and break the sealing by the O-rings, so that the fuel remaining in conduits 12, 12a, 13 and 13a and manifolds 14 and 15 will drain into the housing chambers 22a and 32a; in the former, the drainage will be through the ports 22c, around the head of piston 25 and over the valve seat 24a, whence it can leak past the loose fit between the piston 25 and the wall defining bore 24 and also through internal passages 28 and flow out through passage 23b and outlet port 23a into the overboard drain conduit 29, or to some other drainage disposal structure; in the latter, the drainage will be from conduit 13a into internal port 38b, around the sealing ring 27 and over the valve seat 24a, thence following a path similar to that in the case of valve 20.

It will be apparent that in this manner the initial fuel supply pressure will close both drainage valves, that upon increase in pressure, both valves still will be kept in closed or seated position and that upon release of the fuel supply pressure, valve assemblies 20 and 21 will open and the fuel drain from conduits 12 and 13 and manifolds 14 and 15.

The modification of the fuel manifold drain arrangement disclosed in Fig. 2 differs from the arrangement disclosed in Fig. 1 by the substitution of a single stem drain valve assembly 120 for the pair of drain valve assemblies 20 and 21 and in parallel with the manifolds, the numbering in Figs. 1 and 2 which is duplicated referring to the same elements.

The valve assembly 120 comprises the chamber housing 121 and valve proper 122, joined to each other by screw thread means. The housing includes chamber 121a and outlet ports 121b.

The valve 122 has a stepped cylindrical bore 123 with the outer or larger part of the bore 123 having an outwardly flaring valve seat at 123a and a shoulder at 123b and the inner or smaller part of the bore having an outwardly flaring valve seat 123c, ending at the shoulder 123b, and a shoulder 123d, the latter surrounding a passage 124 communicating with port 125.

A differential piston 126 fits into the bore 123 and has an outer configuration thereto, fitting loosely in the outer part of the bore and having a substantially fluid tight seal with the surface defining the inner part of the bore as at 128. The piston contains a spacing projection 126a to limit the open position of the valve piston and a pair of grooves 126b and 126c for the reception of sealing O-rings 127a and 127b, which coact with the valve seats 123a and 123c respectively. Internal passages 126d are formed at the bottom of the differential piston and serve to complete communication between passage 124 and overboard drain 129 through outlet port 123e.

Spring 130 rests on shoulder 123b and acts against shoulder 126e as it is restrained between the valve piston 126 and the walls of the outer part of bore 123.

In operation, the valve assembly 120 will function as follows: the initial low pressure fuel supply passes through conduits 12 and 13 but because of the interposition of the flow divider 16, only fuel manifold 14 becomes pressurized. The fuel pressure is communicated through conduit 12a, chamber 121a and outlet ports 121b, against the head of piston 126, which is forced into closed or seated position, the O-rings 127a and 127b providing positive sealing against drainage from conduits 12 and 13. As the fuel pressure increases, the flow divider becomes operative and fuel is provided in fuel manifold 15. The fuel pressure is communicated through conduit 13a, port 125 and outlet 124 against the base of the valve piston 126. However, because the fuel pressure in conduit 12 normally is higher than that in conduit 13a due to pressure drop across the flow divider, and because of the difference in areas of the head and base of valve piston 126, the valve piston will remain seated despite the action of spring 130.

Upon release of the fuel pressure, the valve piston is unseated and conduits 12 and 13 and manifolds 14 and 15 are drained overboard through drain 129 as follows: the fuel from conduit 12 and manifold 14 passes through conduit 12a, housing chamber 121a and ports 121b around the head and sides of the piston 126 and overboard through the drain 129. Similarly, conduits 13 and manifold 15 are drained when the fuel flows through conduit 13a and passages 124 and 126d into the overboard drain 129. In this manner my single stem drain valve assembly is positively seated at a predetermined minimum fuel pressure and automatically opened when such pressure is cut off.

It will be evident to those skilled in the art that various modifications in the drain valve sealing arrangements are possible, as shown in Fig. 2a, wherein a flexible washer 227 is substituted for the O-ring 127a, and shoulder 223 is used in place of valve seat 123a. The head of piston 126 is modified to receive the washer, held in place by a snap ring 228, and the drainage is controlled similarly to that in the system disclosed in Fig. 2, the flexible washer providing the positive drainage seal from the small slot manifold when it contacts the shoulder at 223, and the O-ring 127b providing a drainage seal from the large slot manifold by contacting valve seat 123c. In this modification, the valve piston 126 can fit loosely into the bore 123 since the outlet port 123e leading to overboard drain 129 is disposed between the sealing contact surfaces, 123c and 223.

Obviously, other valve structure having equivalent functions could be used in the arrangements disclosed above. However, the disclosed novel drainage arrangements satisfy the exacting requirement for fuel manifold drainage in aircraft gas turbines.

Although many changes can be made in the disclosed apparatus without departing from the scope of the claims, it is intended that all matter contained in the preceding description and shown in the accompanying drawing shall be interpreted as illustrated and not limitative.

What I claim as new and desire to secure by Letters Patent of the United States is:

1. In combination with a fuel providing system for an aircraft gas turbine combustion chamber having fuel nozzles supplied from pressurized fuel manifolds with the flow of fuel to one of said manifolds being controlled by the fuel pressure in said system, an automatic drainage arrangement comprising a valve assembly interconnecting said manifolds and in parallel therewith and having an outlet externally open of the system, said valve assembly including a stepped bore section having a pair of spaced sealing seats, a valve piston fitting into said section and carrying sealing means for cooperation with said seats, and a spring adapted to be retained in said section between said piston and the inner of said pair of seats, the wider portion of said section being in communication with a manifold subject to existent fuel pressure and the narrower portion of said section being in communication with said other of said manifolds whereby differential pressure maintains said valve piston in sealing position to prevent fuel drainage from said system, and an outlet for fuel drainage upon fuel pressure relief.

2. A single stem check valve in combination with a fuel providing system for an aircraft gas turbine combustion chamber having fuel spray nozzles provided with fuel from a pair of sequentially pressurized manifolds comprising a casing in parallel with said manifolds having a stepped bore with an inlet from each manifold thereto and a pair of valve seats therein, a differential spring-biased valve piston slidable in said bore, and cooperable with said seats, an outlet in said casing located between said inlets, said piston seating itself upon the application of fluid pressure thereto to close said outlet, the spring biasing said piston to unseated position upon the diminution of pressure to connect said inlets and outlet to drain said manifolds.

3. In a system for providing nozzle means with pressurized fuel sequentially from a pair of manifolds including means for supplying fuel to said manifolds, a fuel drain arrangement interconnecting said manifolds and comprising means responsive to a pre-determined pressure, an outlet from said drain arrangement, the inlet to said last mentioned means being in communication with said means for supplying fuel to said manifolds whereby initial fuel pressure will seat the pressure responsive means to prevent flow from said system through said outlet, said pressure responsive means being unseated to open said outlet upon diminution of said initial fuel pressure, said pressure responsive means comprising a single check valve with its inlets connected in parallel to said means for supplying fuel to said manifolds.

4. A drain arrangement for a fuel providing system for fuel nozzles supplied from a pair of manifolds, the fuel flow from a source to one of said manifolds being controlled by the pressure of said fuel, said arrangement interconnecting said manifolds and comprising pressure responsive means having inlets in parallel connection with said pair of manifolds, said arrangement including a drain outlet for receiving fuel upon relief of fuel pressure, said pressure responsive means comprising a single stem check valve including a stepped piston and bore section for receiving the same, said piston and section having corresponding cooperating means for sealing against fuel flow through said inlets, said piston being seated to prevent fuel drainage by initial fuel pressure.

5. A fuel drainage system including a pair of manifolds for supply of fuel to separate sets of fuel nozzles, means to supply fuel to said manifold in sequential order, said means including a pressure responsive valve in parallel with said manifold, a spring-biased differential piston therein, valve seats cooperable with said piston to prevent the flow of fuel through said valve when said piston is seated, said valve having fuel inlets from said fuel supply means on opposite sides of said piston, and an outlet in said valve between said inlets connected with said inlets upon the release of pressure in said manifolds by the unseating of said piston by said spring.

References Cited in the file of this patent
UNITED STATES PATENTS 2,619,162     Feilden _____ Nov. 25, 1952